(12) United States Patent
Nakayama et al.

(10) Patent No.: US 12,712,575 B2
(45) Date of Patent: Aug. 18, 2026

(54) HIGH FREQUENCY MODULE

(71) Applicant: Proterial, Ltd., Tokyo (JP)

(72) Inventors: Satoshi Nakayama, Tokyo (JP); Nobuaki Kitano, Tokyo (JP)

(73) Assignee: Proterial, Ltd., Tokyo (JP)

( * ) Notice: Subject to any disclaimer, the term of this patent is extended or adjusted under 35 U.S.C. 154(b) by 226 days.

(21) Appl. No.: 18/468,936

(22) Filed: Sep. 18, 2023

(65) Prior Publication Data

US 2024/0106471 A1 Mar. 28, 2024

(30) Foreign Application Priority Data

Sep. 26, 2022 (JP) ................................ 2022-152365

(51) Int. Cl.
*H04B 1/04* (2006.01)
*H04B 1/16* (2006.01)
*H04B 1/18* (2006.01)

(52) U.S. Cl.
CPC ............. *H04B 1/04* (2013.01); *H04B 1/1607* (2013.01); *H04B 1/18* (2013.01)

(58) Field of Classification Search
CPC .......... H04B 1/04; H04B 1/1607; H04B 1/18; H04B 1/08; H04B 5/22; H01L 2924/1616; H01L 2924/30107; H01L 2924/19032; H01L 2924/19041; H01L 2924/19051; H01L 2924/19106; H01L 23/64; H01L 23/66; H01L 2224/48227; H01L 2924/3011; H01L 2924/30111; H01Q 21/0075; H01Q 21/065; H01Q 23/00; H01Q 1/2283; H01Q 13/106; H01Q 13/08
See application file for complete search history.

(56) References Cited

U.S. PATENT DOCUMENTS 5,923,295 A * 7/1999 Nakano .............. H01Q 21/0075
10,321,555 B1 * 6/2019 Trulli ...................... H01L 23/66
2006/0164179 A1 7/2006 Arai et al.
(Continued)

FOREIGN PATENT DOCUMENTS

EP 0283396 A1 9/1988
JP S63254802 A 10/1988
(Continued)

OTHER PUBLICATIONS

Japanese Notice of Reasons for Refusal dated Nov. 18, 2025 for corresponding Japanese Application No. 2022-152365, filed Sep. 26, 2022.

*Primary Examiner* — Lana N Le
(74) *Attorney, Agent, or Firm* — David D. Brush; Westman, Champlin & Koehler, P.A.

(57) ABSTRACT

A high frequency module includes a first board including a connection portion protruding from an end portion thereof, and a second board including a board through-hole penetrating the second board in a thickness direction thereof. The first board includes a connection pattern connecting a terminal pad formed on a leading end of the connection portion penetrating the board through-hole and a first line pattern forming a tri-plate line. The connection pattern has a line width increasing stepwise from the terminal pad toward the first line pattern. The second board includes a connection pad electrically connected to the terminal pad penetrating the board through-hole.

6 Claims, 16 Drawing Sheets

(56) References Cited

U.S. PATENT DOCUMENTS

2006/0286959 A1* 12/2006 Knecht .................... H04B 1/18
455/349
2018/0212335 A1* 7/2018 Kado ................. H01Q 21/0075
2020/0411964 A1* 12/2020 Li ........................ H01Q 21/065
2021/0091803 A1* 3/2021 Takeuchi ................. H04B 1/04
2021/0091807 A1* 3/2021 Shinozaki ............ H04B 1/0475
2022/0059926 A1* 2/2022 So ........................ H01Q 1/2283
2025/0096481 A1* 3/2025 Azuma .............. H01Q 21/0075

FOREIGN PATENT DOCUMENTS

JP 2006211070 8/2006
JP 6916985 B2 8/2021

* cited by examiner

HIGH FREQUENCY MODULE

CROSS-REFERENCE TO RELATED APPLICATIONS

This application claims the benefit of Japanese Patent Application No. 2022-152365 filed on Sep. 26, 2022, with the Japan Patent Office, the entire disclosure of which is incorporated herein by reference.

BACKGROUND

The present disclosure relates to a technique of interconnecting high frequency lines formed on differing boards.

Japanese Patent No. 6916985 discloses a connection structure used for connecting a tri-plate line formed on a first board and a microstrip line formed on a second board. Specifically, a through-hole is formed in the second board, and a U-shaped pad pattern is provided on one end of the microstrip line to sandwich the through-hole from both sides. An edge portion of the first board includes a protrusion-like connection portion dimensioned to pass through the through-hole. A terminal pad connected to a signal line pattern of the tri-plate line is provided at a tip part of the connection portion. The first board and the second board are assembled in a state in which the connection portion of the first board penetrates the through-hole of the second board. In this state, the terminal pad formed at the tip part of the connection portion penetrating the through-hole is soldered to the pad pattern arranged to sandwich a penetrating part. Thus, high frequency lines formed on the differing boards are electrically connected to each other.

SUMMARY

It was found that, when a high frequency module designed to operate in a certain frequency band is used by expanding its working frequency band to a higher band side, losses tend to occur due to a signal reflection at connection portions (i.e., a through-hole and a connection portion) of both lines. For example, when a working frequency band is expanded to 5 GHz in a high frequency module (for example, an antenna apparatus) designed to operate at 3 GHz or lower, losses occurred due to a signal reflection at a connection portion and the like, and desired performance (for example, a VSWR) could not be achieved. Herein, the VSWR is an abbreviation of a Voltage Standing Wave Ratio.

One aspect of the present disclosure provides a technique enabling reduction in a loss at a connection portion of lines, and expansion of a working frequency range of a high frequency module to higher frequency.

One embodiment of the present disclosure provides a high frequency module comprising a first board and a second board. The first board comprises a connection portion protruding from an end portion thereof. The second board comprises a board through-hole penetrating the second board in a thickness direction thereof and receiving the connection portion inserted therethrough, and is integral to the first board with the connection portion being inserted through the board through-hole. The first board comprises first line patterns, a terminal pad, and a connection pattern. The first line patterns are provided on both surfaces of the first board to be opposite to each other and to form a tri-plate line. The terminal pad is formed on a leading end of the connection portion penetrating the board through-hole. The connection pattern connects the first line pattern and the terminal pad, and has a line width increasing stepwise from the terminal pad toward the first line pattern. The second board comprises a second line pattern and a connection pad. The second line pattern is formed on a pattern surface of the second board to form a microstrip line together with a ground pattern formed on a grounding surface opposite to the pattern surface. The connection pad surrounds at least a portion of the board through-hole on the pattern surface, is connected to one end of the second line pattern, and is electrically connected to the terminal pad penetrating the board through-hole.

This configuration enables reduction in a loss at a connection portion of lines, and expansion of a working frequency range of a high frequency module to higher frequency.

BRIEF DESCRIPTION OF THE DRAWINGS

The present disclosure will now be described by way of examples with reference to the accompanying drawings, in which:

FIG. 2 is a schematic cross-sectional view taken along the line II-II in

FIG. 1A;

DETAILED DESCRIPTION OF EXAMPLE EMBODIMENTS

1. Configuration

Figure 1A:
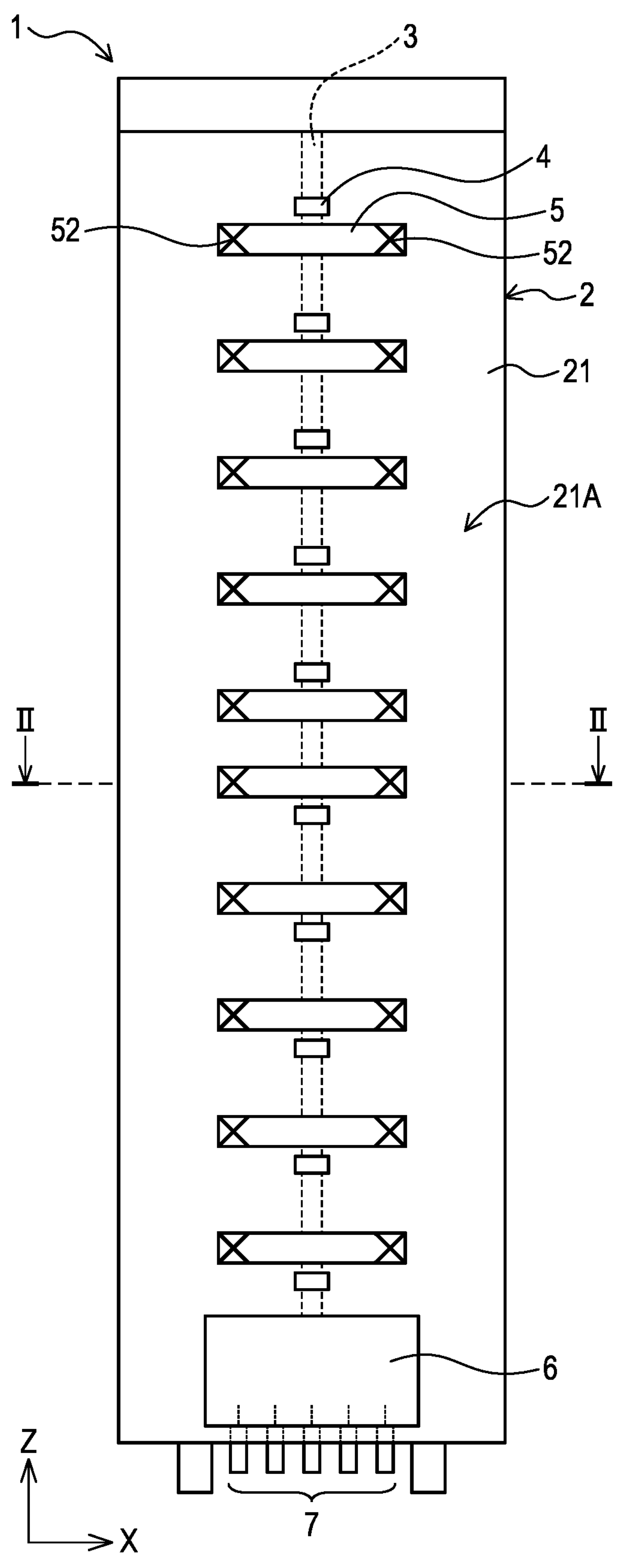
FIG. 1A is a schematic front view of a high frequency module.
Figure 1B:
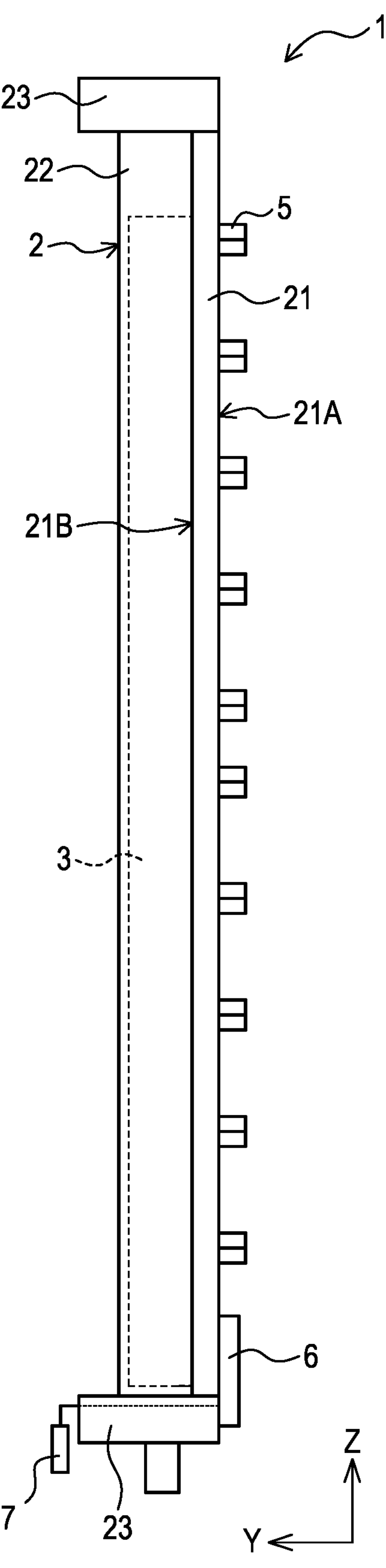
FIG. 1B is a schematic side view of the high frequency module.

As shown in FIGS. 1A to 6, FIG. 8A, and FIG. 8B, a high frequency module 1 according to one embodiment of the present disclosure comprises a metal frame 2, a plurality of circuit boards 3, a plurality of connection boards 4, a plurality of antenna boards 5, a distribution board 6, and a connector group 7.

[1-1. Metal Frame]

The metal frame 2 integrally supports the plurality of circuit boards 3, the plurality of connection boards 4, the plurality of antenna boards 5, the distribution board 6, and the connector group 7. The metal frame 2 is made of, for example, aluminum or aluminum alloy. The metal frame 2 is a grounding conductor that is grounded. The metal frame 2 comprises a base plate 21, a plurality of wall plates 22, and two end plates 23.

The base plate 21 has a plate surface in a rectangular shape. Hereinafter, an axis along a short direction of the plate surface of the base plate 21 is defined as an X-axis, an axis along a longitudinal direction of the plate surface of the base plate 21 is defined as a Z-axis, and an axis perpendicular to the X-axis and Z-axis, that is, along a thickness direction of the plate surface of the base plate 21 is defined as a Y-axis. Also, one plate surface of the base plate 21 is defined as a reflective surface 21A, and a plate surface opposite to the reflective surface 21A is defined as a support surface 21B. The high frequency module 1 is arranged such that the Z-axis is parallel to a vertical direction, and the X-axis and Y-axis are parallel to a horizontal direction.

The end plate 23 is provided at each end of the base plate 21 in a Z-axis direction. The connector group 7 is provided to the end plate 23 positioned in a lower end in the vertical direction. As a connector belonging to the connector group 7, for example, a BNC connector that connects a coaxial cable or the like is used.

The plurality of connection boards 4 and the plurality of antenna boards 5 are arrayed along the Z-axis direction between the two end plates 23 on the reflective surface 21A of the base plate 21. The reflective surface 21A has a function of reflecting a radio wave toward the antenna board 5 arranged on the reflective surface 21A. On one end of the reflective surface 21A in the Z-axis direction (i.e., herein, the lower end), the distribution board 6 is provided.

On the support surface 21B of the base plate 21, the plurality of wall plates 22 is provided along an X-axis direction.

The plurality of wall plates 22 is arranged to protrude from the support surface 21B in a Y-axis direction such that a thickness direction of each wall plate 22 is in conformance with the X-axis direction. The plurality of wall plates 22 is equally spaced from each other in the X-axis direction.

As shown in FIG. 2 to FIG. 5, the support surface 21B comprises a board support groove 21C formed along the Z-axis direction in an intermediate position between two adjacent wall plates 22. The board support groove 21C has a groove width that allows insertion of a side edge portion of each circuit board 3. The board support groove 21C supports the circuit board 3 inserted thereinto, between the two wall plates 22. The wall plates 22 are equal in size to each other, and each have dimensions to cover the entirety of the circuit board 3 supported by the board support groove 21C as the circuit board 3 is seen from the X-axis direction.

The plurality of circuit boards 3 is arrayed on the support surface 21B along the X-axis direction, and each circuit board 3 is supported to be interposed between the two wall plates 22. The plurality of wall plates 22, together with wiring patterns formed on the plurality of circuit boards 3, forms tri-plate lines. In other words, the plurality of wall plates 22 functions as external conductors of the tri-plate lines.

The base plate 21 comprises a plurality of frame through-holes 21D penetrating the base plate 21 in the thickness direction. The frame through-holes 21D are provided in at least part of places where the connection boards 4 or the antenna boards 5 arranged on the reflective surface 21A intersect the board support grooves 21C formed in the support surface 21B.

In the present embodiment, the entirety of the base plate 21 and the plurality of wall plates 22 are configured as one component. The base plate 21 may be formed of, for example, a central part, in which the plurality of wall plates 22 is provided (in other words, the plurality of circuit boards 3 is arranged), and a main body, which comprises an outer part relative to the central part in the X-axis direction, the central part and the main body being different members from each other. In this case, the central part may be fixed to the main body, for example, with a bolt, in a state where the central part is fit to the main body.

[1-2. Antenna Board]

The antenna boards 5 are printed wiring boards having similar configurations.

Each antenna board 5 comprises a ground pattern 51 formed on a substantially entirety of one surface (hereinafter, a grounding surface) 5A. The antenna board 5 comprises a wiring pattern formed on the other surface (hereinafter, a pattern surface) 5B opposite to the grounding surface 5A, the wiring pattern functioning as an antenna device 52, an antenna feed line 53, and a connection pad 54. For the antenna device 52, see especially FIG. 1A. The antenna feed line 53 and the connection pad 54 are shown in details in FIG. 3A, FIG. 6, and FIG. 8A but are not shown in FIGS. 1A and 1B. The shape of the antenna board 5 is shown schematically in the drawings and is not limited to the shapes shown in the drawings.

Each antenna board 5 comprises two antenna devices 52 arranged at both ends thereof in a direction parallel to the X-axis of the antenna device 52, as shown in FIG. 1A. Each of the two antenna devices 52 is formed such that two linear antenna devices with polarization angles orthogonal to each other are assembled in an X shape. Of the two linear antenna devices forming one antenna device 52, the polarization angle of one linear antenna device is set at +45° with respect to the horizontal direction, and the polarization angle of the other linear antenna device is set at −45° with respect to the horizontal direction.

The plurality of antenna boards 5 is spaced away from each other in an up/down direction (i.e., the Z-axis direction). Accordingly, in the present embodiment, the high frequency module 1 includes two rows of the plurality of the antenna devices 52 arrayed in the up/down direction. However, an arrangement pattern of the plurality of antenna devices 52 is not limited to such arrangement pattern.

Figure 2:
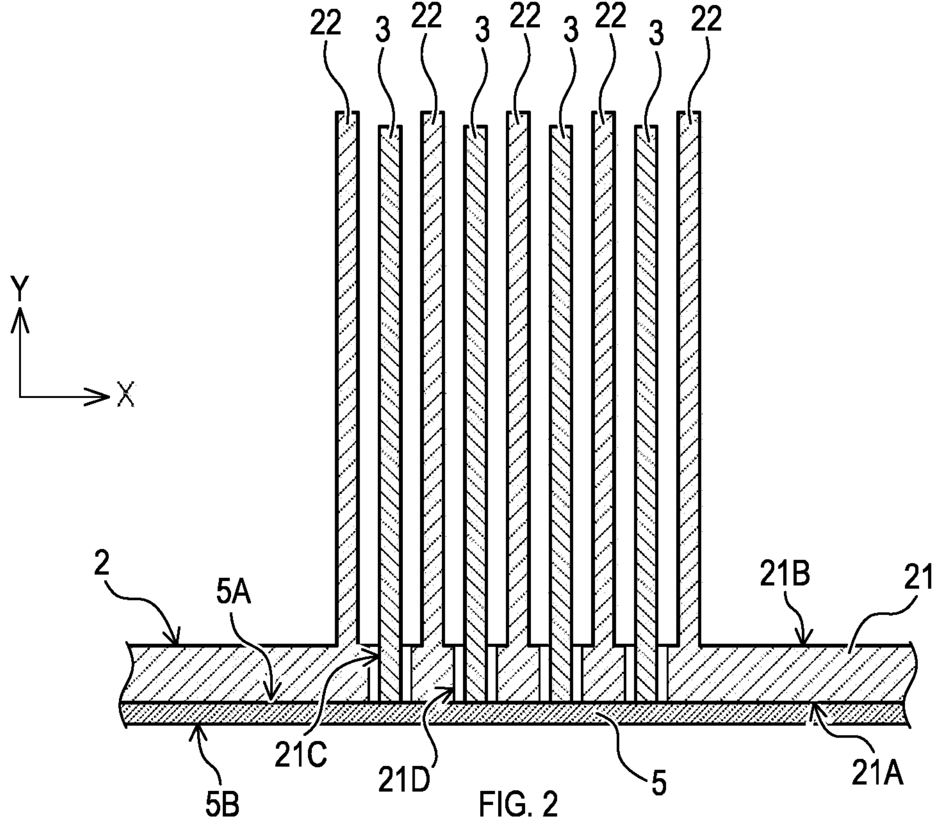
Figure 4:
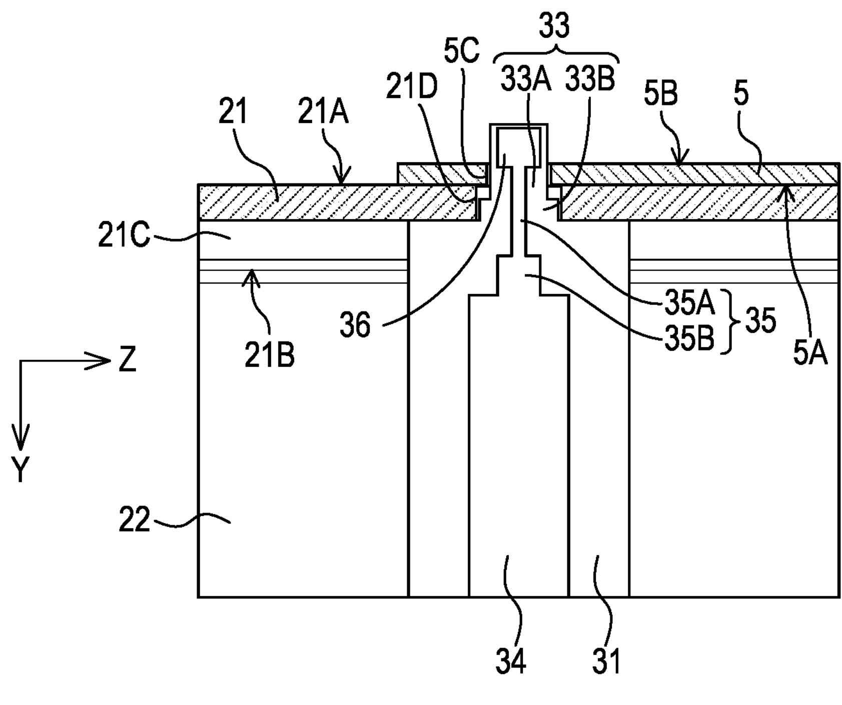
FIG. 4 is a schematic cross-sectional view of the metal frame and the antenna board taken along the line IV-IV in FIG. 3A, and of a schematic diagram showing a circuit board supported by the metal frame.
Figure 5:
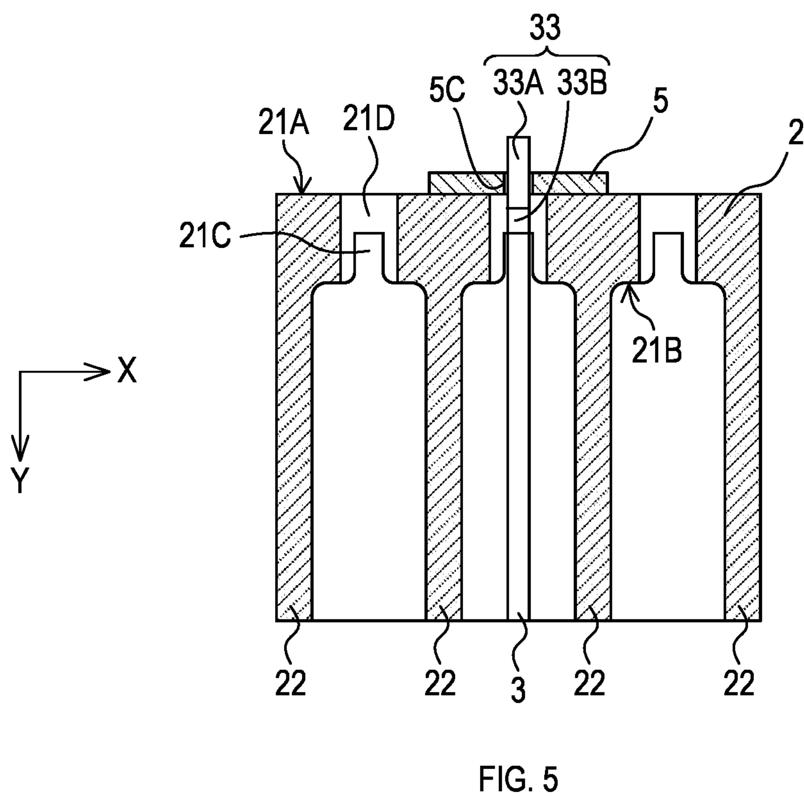
FIG. 5 is a schematic cross-sectional view of the metal frame and the antenna board taken along the line V-V in FIG. 3A, and a schematic diagram showing the circuit board supported by the metal frame.

The antenna board 5 is arranged such that the grounding surface 5A is in contact with the reflective surface 21A of the base plate 21, as shown in FIG. 2 and FIG. 4. The ground pattern 51 of the antenna board 5 may be covered with a resist layer having insulating properties. In this case, the ground pattern 51 of the antenna board 5 and the metal frame 2 are electromagnetically coupled via the resist layer.

Figure 3A:
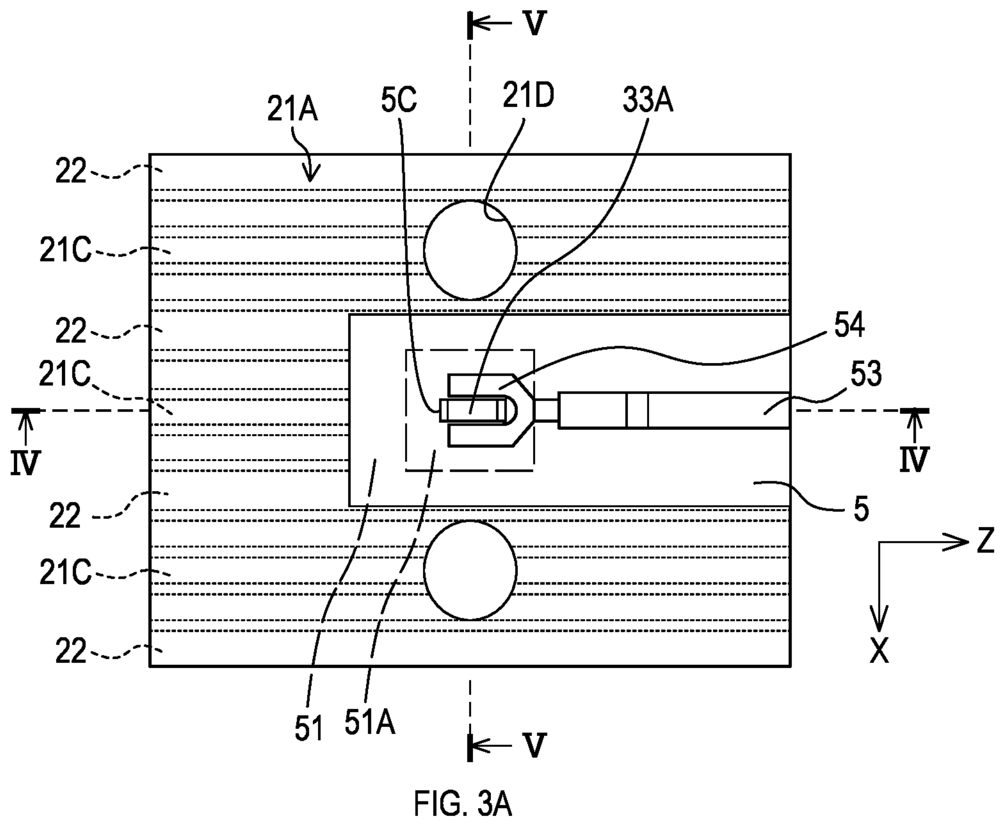
FIG. 3A is a schematic front view of a portion of a metal frame to which an antenna board is attached, as seen from a reflective surface side of a base plate.
Figure 3B:
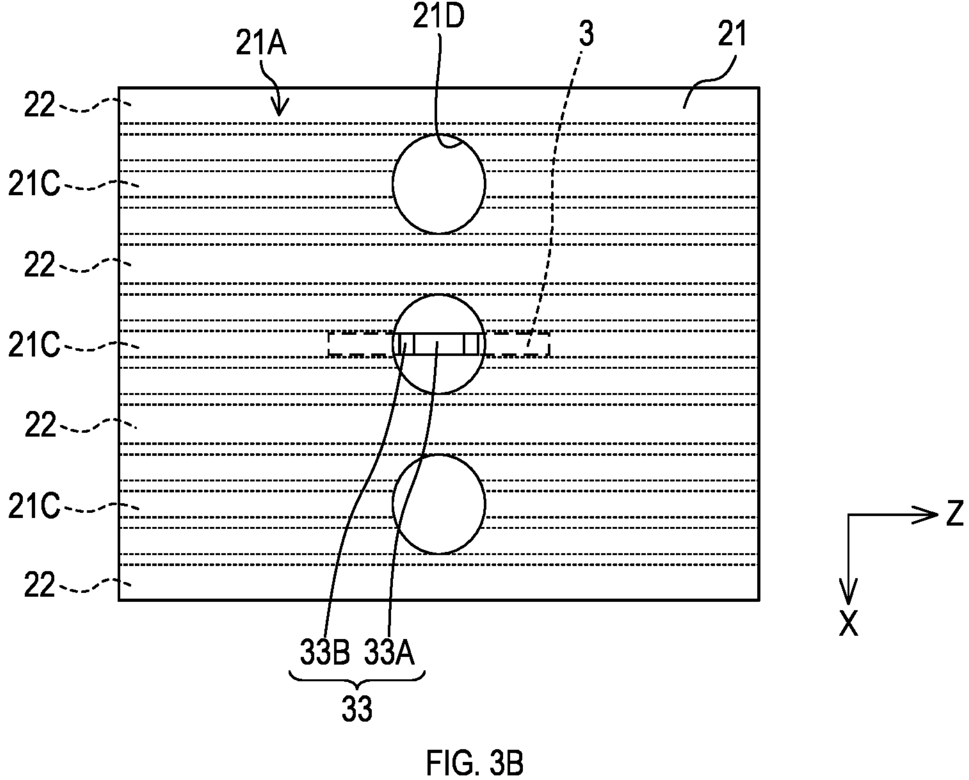
FIG. 3B is a schematic front view of the portion shown in FIG. 3A, without illustrating the antenna board.
Figure 6:
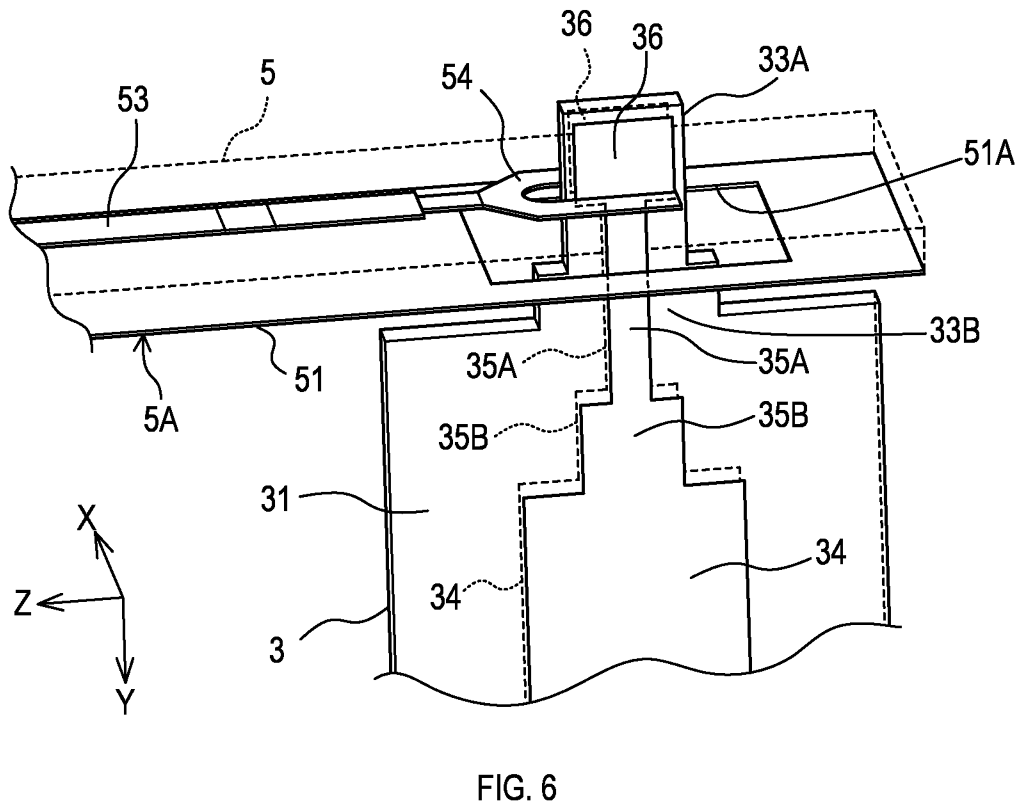
FIG. 6 is a schematic transparent view of a configuration around a portion where the antenna board and the circuit board are electrically connected to each other.

As shown in FIG. 3A and FIG. 6, the antenna board 5 comprises a pattern-removed portion 51A, in which a portion of the ground pattern 51 is removed. The pattern-removed portion 51A is situated in a position opposite to the frame through-hole 21D when the antenna board 5 is arranged on the reflective surface 21A. In other words, the antenna board 5 is arranged such that the pattern-removed portion 51A covers the frame through-hole 21D on the reflective surface 21A of the base plate 21.

The antenna board 5 comprises a board through-hole 5C in a rectangular shape for inserting a leading end portion 33A of a connection portion 33 of the circuit board 3, which will be described later. The board through-hole 5C is situated in a center part of a position facing the frame through-hole 21D (i.e., the position of the pattern-removed portion 51A) when the antenna board 5 is arranged on the reflective surface 21A of the base plate 21.

Figure 8A:
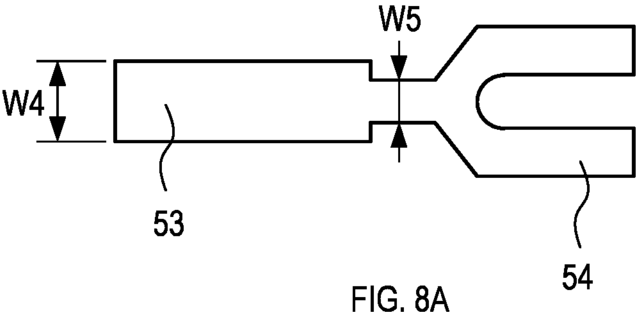
FIG. 8A is an explanatory diagram showing a pad pattern shape and a pattern shape around a connection portion of the present disclosure.

As shown in FIG. 3A and FIG. 8A, the connection pad 54 is formed to surround the board through-hole 5C on the pattern surface 5B of the antenna board 5. Specifically, the connection pad 54 has a U-shape, which is provided by connecting ends of patterns in the Z-axis direction to each other, the patterns sandwiching the board through-hole 5C from both sides along two edge portions extending in the Z-axis direction among edge portions of the board through-hole 5C having the rectangular shape.

The antenna feed line 53 has one end connected to the antenna device 52, and the other end connected to the connection pad 54. Of the antenna board 5, the antenna feed line 53 formed on the pattern surface 5B functions as a microstrip line, together with the ground pattern 51 formed on the grounding surface 5A.

[1-3. Connection Board]

The connection board 4 is for electrically interconnecting the different circuit boards 3 on which feed circuits of the same system are mounted. The connection board 4 is arranged on the reflective surface 21A of the base plate 21, and electrically connected to the circuit board 3 via the frame through-hole 21D.

Structures of a board through-hole and a connection pad provided for electrically connecting the connection board 4 and the circuit board 3 via the frame through-hole 21D are the same as those of the board through-hole 5C and the connection pad 54 provided for electrically connecting the antenna board 5 and the circuit board 3.

[1-4. Circuit Board]

The circuit board 3 is formed of a dielectric board in a strip shape. Wiring patterns are formed on both surfaces of the dielectric board. The circuit board 3 is shown schematically in FIGS. 1A and 1B, and is shown in more details in FIGS. 2 to 6 and 8B. The circuit board 3 comprises at least one connection portion 33 at an end side thereof, which is inserted into the board support groove 21C. The connection portion 33 is a protrusion-like portion formed to pass through the frame through-hole 21D of the base plate 21 and through the board through-hole 5C of the antenna board 5 (or the connection board 4) when the circuit board 3 is supported by the metal frame 2 in a specific position.

As shown in FIG. 4 to FIG. 6 and FIG. 8B, the connection portion 33 comprises the leading end portion 33A and a base portion 33B. The leading end portion 33A is positioned on a leading end side of the connection portion 33, and has a width that is insertable through the board through-hole 5C. The base portion 33B is positioned on a base side of the connection portion 33, and has a width that is insertable into the frame through-hole 21D. In other words, if the base portion 33B is inserted into the frame through-hole 21D, then a position of the circuit board 3 relative to the base plate 21 is determined, and the leading end portion 33A of the connection portion 33 is positioned in the center of the frame through-hole 21D. Further pushing the circuit board 3 to a base plate 21 side in this state causes the leading end portion 33A of the connection portion 33 to be inserted through the board through-hole 5C.

The circuit board 3 comprises wiring patterns formed on both surfaces of a dielectric board 31 for functioning as feed lines 34, connection lines 35, and terminal pads 36. The wiring patterns are identically shaped, as viewed from one side in a thickness direction of the circuit board 3 (i.e., symmetrical with respect to the center in the thickness direction of the circuit board 3). The wiring patterns formed on the both surfaces of the circuit board 3 may be electrically connected to each other through a through hole penetrating the circuit board 3.

The feed line 34 is wired such that one end thereof is connected to a feed circuit (not shown) and the other end thereof (hereinafter, a connection portion 33 side end) is positioned opposite the connection portion 33 across a portion of the circuit board 3 to be inserted into the board support groove 21C.

The terminal pad 36 is formed on the entire surface of a portion of the leading end portion 33A of the connection portion 33 penetrating the board through-hole 5C. In other words, a pattern width W1 of the terminal pad 36 in a direction along the Z-axis is the same as a width of the leading end portion 33A along the Z-axis direction.

The terminal pad 36 assembled to the metal frame 2 penetrates the board through-hole 5C and protrudes from the pattern surface 5B of the antenna board 5. The terminal pad 36 protruding from the pattern surface 5B is soldered to the U-shaped connection pad 54 formed around the board through-hole 5C. Thus, the feed line 34 on the circuit board 3 and the antenna feed line 53 on the antenna board 5 are electrically connected to each other.

Figure 8B:
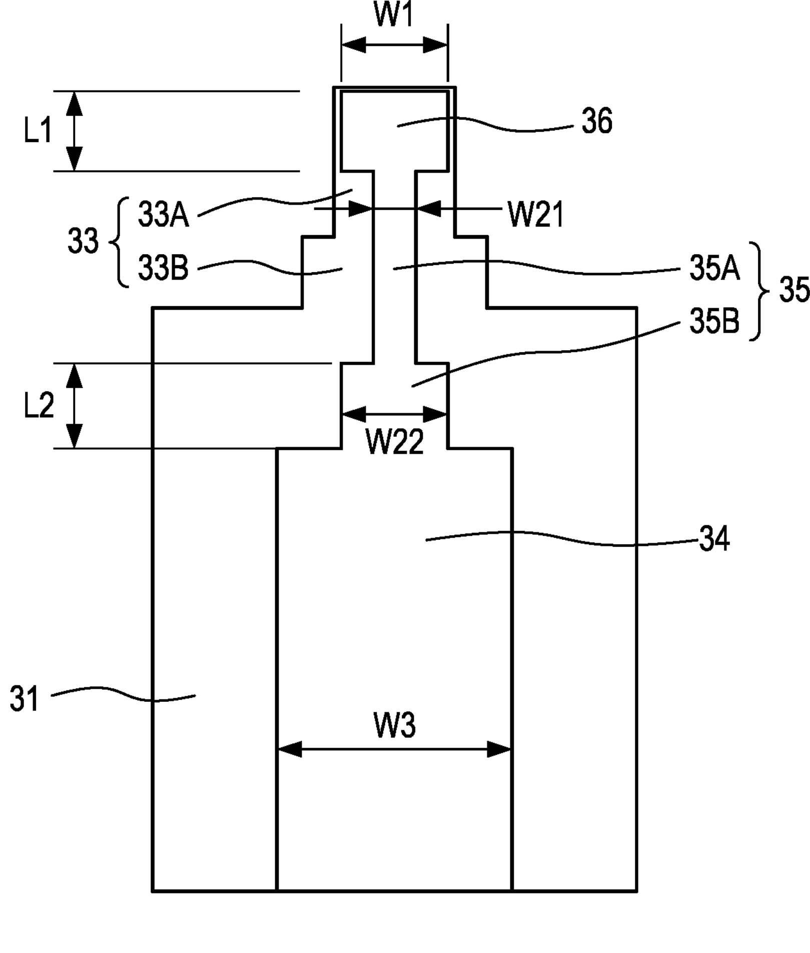
FIG. 8B is an explanatory diagram showing a pad pattern shape and a pattern shape around the connection portion of the present disclosure.

As shown in FIG. 4, FIG. 6, and FIG. 8B, the connection line 35 connecting the feed line 34 and the terminal pad 36 in the connection portion 33 of the circuit board 3 is shaped to have a line width increasing stepwise from a terminal pad 36 side toward a feed line 34 side.

In the present embodiment, the connection line 35 is divided into two steps, one of which is defined as a connection line 35A on the terminal pad 36 side, and the other of which is defined as a connection line 35B on the feed line 34 side. A line width W22 of the connection line 35B is set larger than a line width W21 of the connection line 35A, and smaller than a line width W3 of the feed line 34.

In a state in which the circuit board 3 is supported by the metal frame 2, the connection line 35A is positioned in the center of the frame through-hole 21D and functions as a coaxial line having the connection line 35A as an inner conductor and an inner circumference wall of the frame through-hole 21D as an external conductor.

[1-5. Distribution Board]

The distribution board 6 has a function of electrically connecting the connector group 7 provided on the end plate 23 and respective circuits provided on the plurality of circuit boards 3. Explanation of a specific configuration thereof is omitted.

2. Design

Hereinafter, central frequency in a working frequency band of the high frequency module 1 is defined as reference frequency. A wavelength corresponding to the reference frequency is defined as a reference wavelength λ. A shortened wavelength corresponding to the reference frequency in the circuit board 3 and the antenna board 5 is defined as a reference shortened wavelength λg. A glass epoxy material is used for the antenna board 5 and the dielectric board 31 used for the circuit board 3.

A length L2 of the connection line 35B is set to 2 mm. If the length L2 of the connection line 35B is too long over 2 mm, the structure as the coaxial line in the connection line 35 becomes distorted. If the length L2 of the connection line 35B is too short below 2 mm, an effect of achieving a characteristic of a wider bandwidth cannot be obtained.

The line width W3 of the feed line 34 functioning as the tri-plate line, the line width W21 of the connection line 35A functioning as the coaxial line, and the line width W4 of the antenna feed line 53 functioning as the microstrip line are set such that each of them has an impedance of a specified value (for example, 50Ω) at the reference frequency.

Next, the width W1 of the leading end portion 33A of the connection portion 33 (i.e., the terminal pad 36) is designed such that an average value of a VSWR in the working frequency band is as close to 1.0 as possible. At this time, a length L1 of protrusion of the leading end portion 33A of the connection portion 33 from the pattern surface 5B of the antenna board 5 is set as small as possible to ensure that a sufficient physical strength can be obtained when the terminal pad 36 and the connection pad 54 are soldered to each other.

Assuming the setting described above, the line width W22 of the connection line 35B is set such that an average value of the VSWR in the working frequency band is 1.05 or lower.

After performing the basic design described above, optionally, W1, W22, L1, L2, and the like may be slightly adjusted to optimize the VSWR.

3. Experiments

Figure 9:
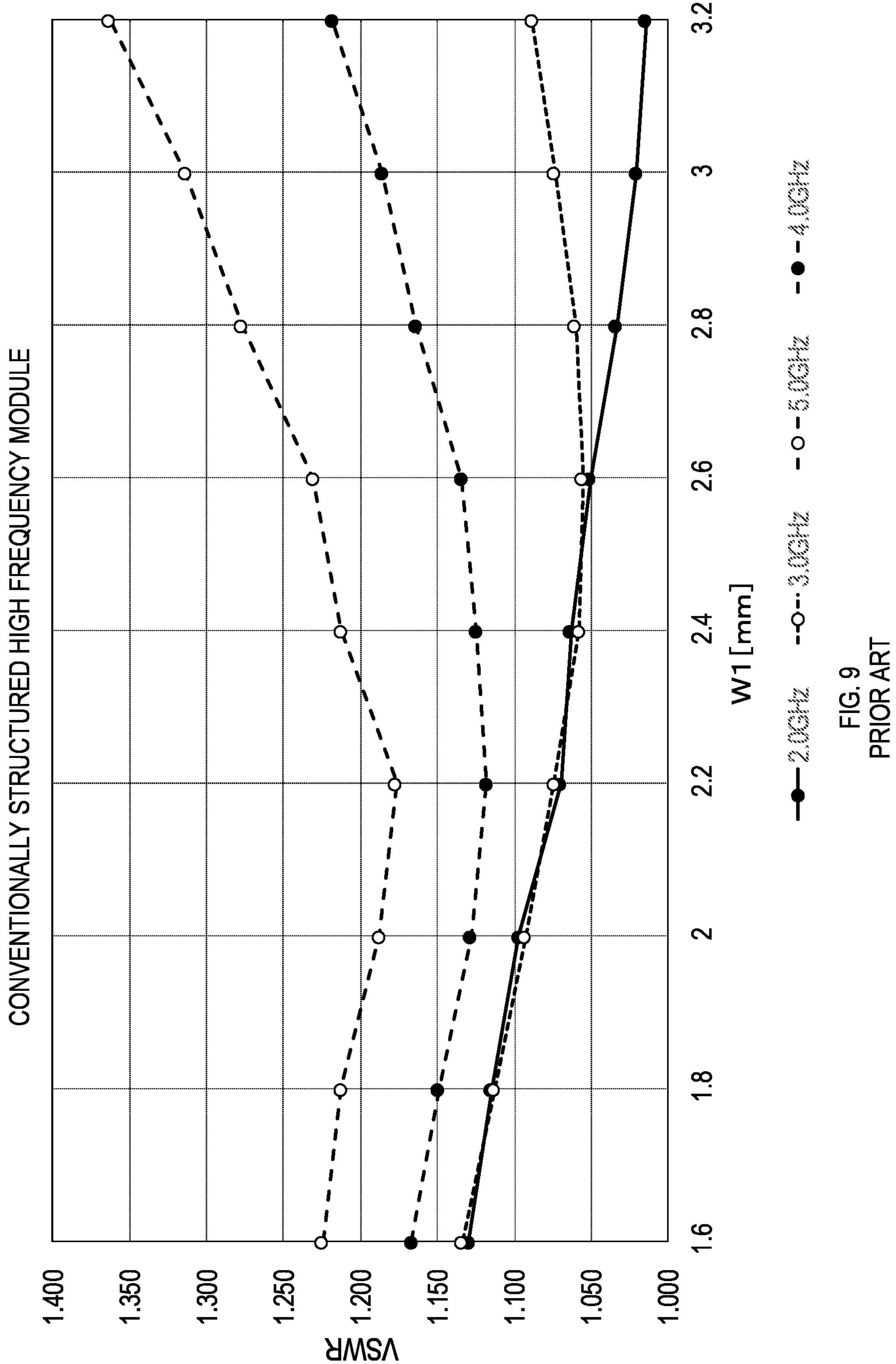
FIG. 9 is a graph showing a calculation result of a VSWR by a simulation where a width (i.e., a pattern width of a terminal pad) W1 of a connection portion to penetrate a board through-hole is varied, in a conventionally structured high frequency module.

FIG. 9 is a graph showing a calculation result of the VSWR by a simulation using a high frequency module having a conventional structure, in which the width W1 of the leading end portion 33A of the connection portion 33 (the width of the terminal pad 36) is varied.

Figure 7A:
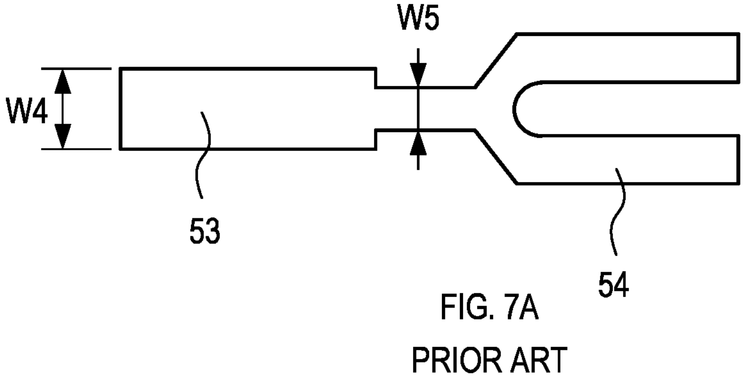
FIG. 7A is an explanatory diagram showing a conventional pad pattern shape and a conventional pattern shape around a connection portion.
Figure 7B:
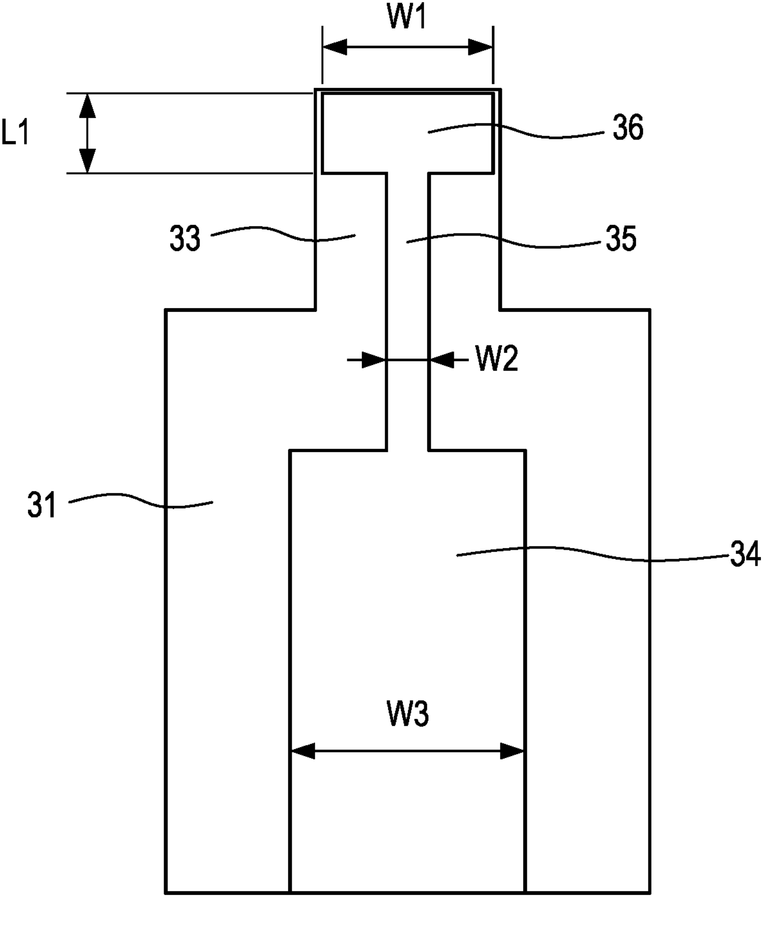
FIG. 7B is an explanatory diagram showing a conventional pad pattern shape and a pattern shape around the connection portion.

Herein, the conventional structure means a structure in which a line width W2 of the connection line 35 is constant, as shown in FIG. 7B. Also, the high frequency module used in the experiment is designed such that the working frequency band is from 0.5 GHz to 3 GHz and the average value of the VSWR in the working frequency band is 1.05 or lower. Specifically, setting was made such that W1=3.2 mm, W2=0.8 mm, W3=4.4 mm, W4=1.5 mm, W5=0.8 mm, and L1=1.5 mm, where W1=3.2 mm to 1.6 mm. Herein, W5 is a pattern width of the connection pad 54. It was assumed that the upper limit of the working frequency band is expanded up to 5 GHz.

As shown in FIG. 9, it was confirmed that the VSWR at 4 GHz or higher is improved by narrowing W1 and that the average value of the VSWR in the working frequency band cannot be made equal to 1.05 or lower in the high frequency module having the conventional structure.

Figure 10:
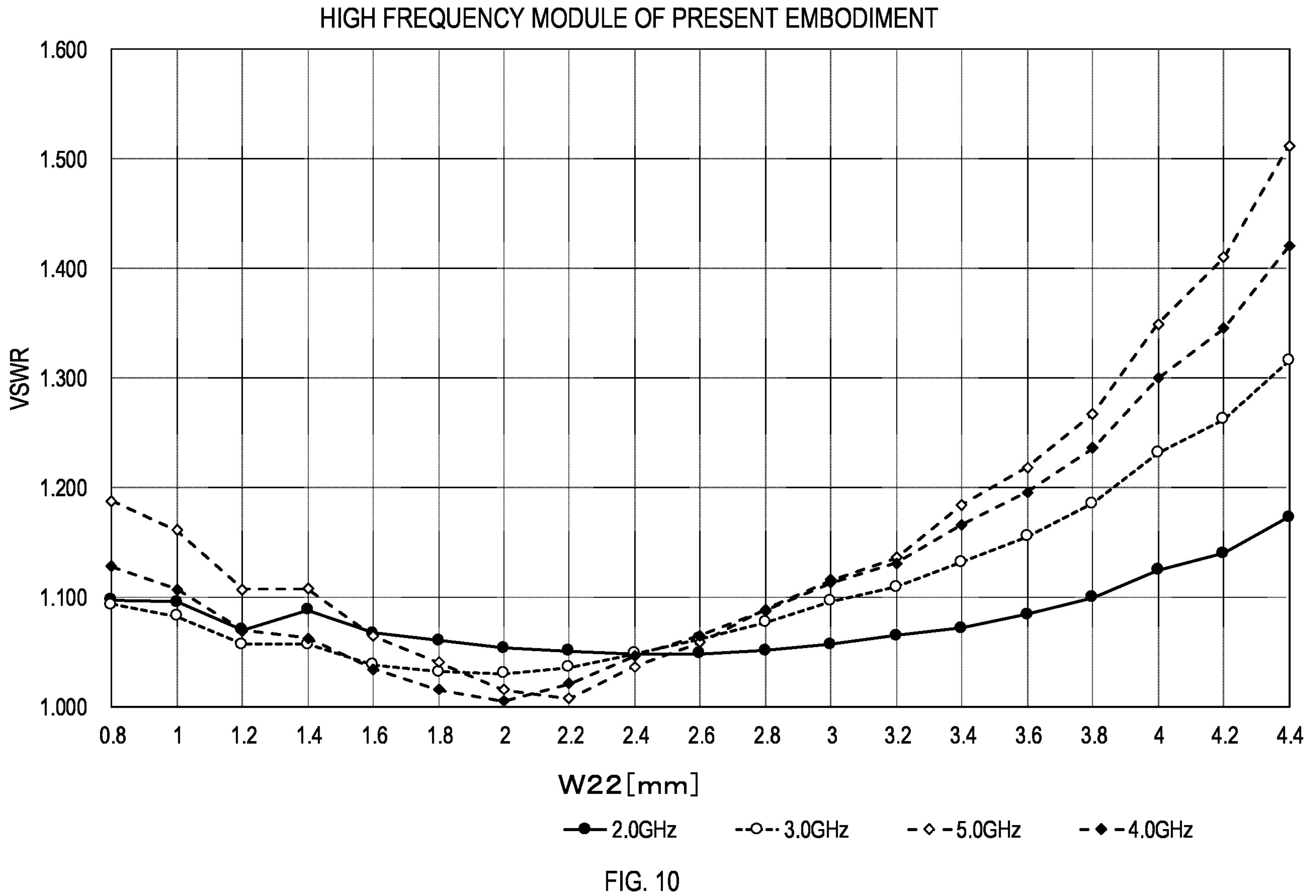
FIG. 10 is a graph showing a calculation result of a VSWR by a simulation where a line width W22 of a connection line on a feed line side is varied in a high frequency module of the present embodiment.

FIG. 10 is a graph showing a calculation result of the VSWR by a simulation using the high frequency module 1 of the present embodiment, in which the line width W22 of the connection line 35B is varied. Specifically, setting was made such that W1=2.0 mm, W21=0.8 mm, W3=4.4 mm, W4=1.5 mm, W5=0.8 mm, L1=1.5 mm, and L2=2.0 mm, where W22=0.8 mm to 4.4 mm.

As shown in FIG. 10, it was confirmed that, where W22=1.6 mm to 2.6 mm (i.e., in the range of 0.021λ to 0.035λ where λ=75.0 mm, and in the range of 0.035λg to 0.057λg where λg=45.8 mm), the average value of the VSWR in the working frequency band was 1.05 or lower.

Figure 11:
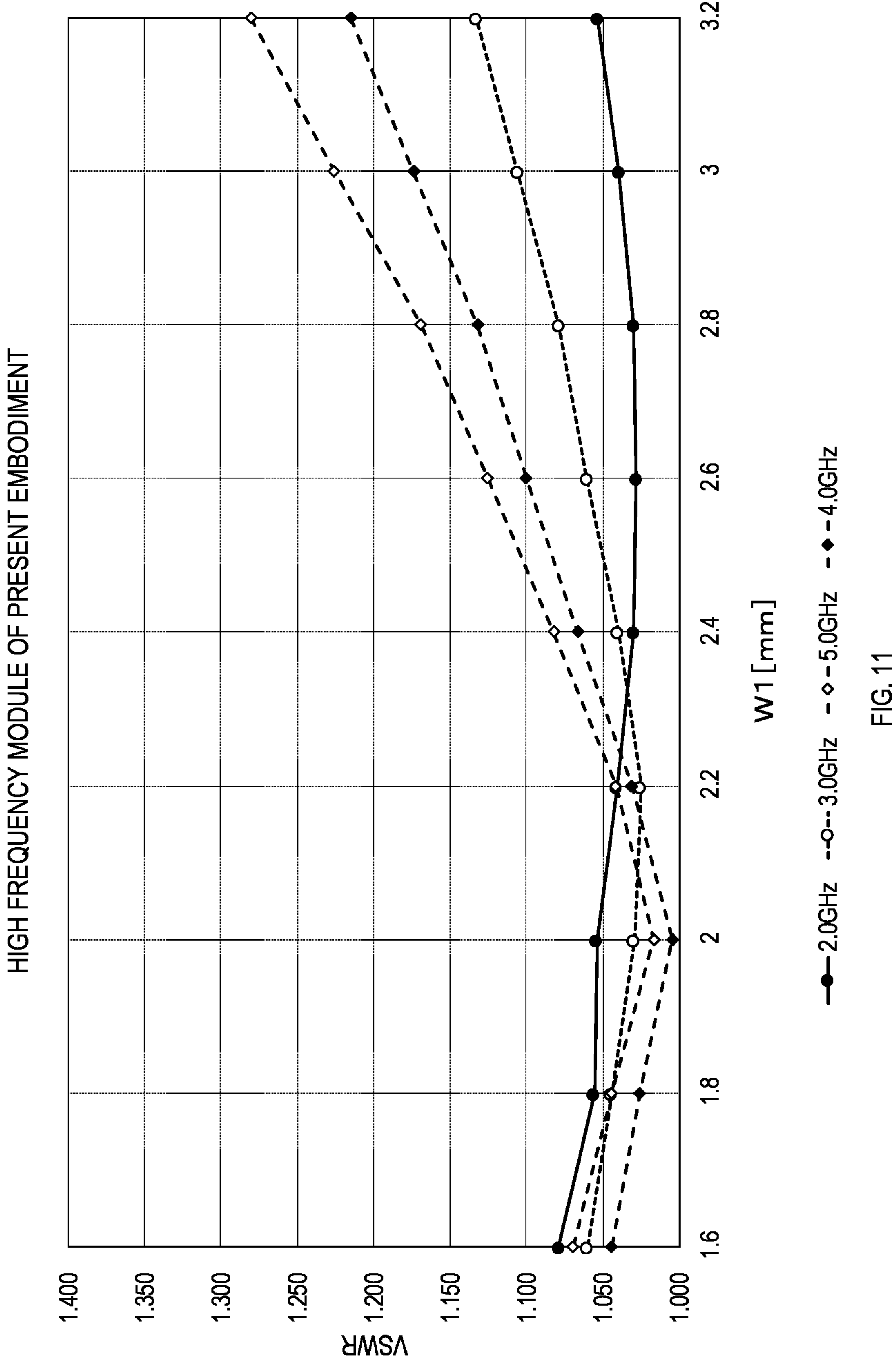
FIG. 11 is a graph showing a calculation result of the VSWR by a simulation where a width W1 of a connection portion is varied in the high frequency module of the present embodiment.

FIG. 11 a graph showing a calculation result of the VSWR by a simulation using the high frequency module 1 of the present embodiment, in which the width of the leading end portion 33A of the connection portion 33 (the width of the terminal pad 36) W1 is varied. Specifically, setting was made such that W21=0.8 mm, W22=2.0 mm, W3=4.4 mm, W4=1.5 mm, W5=0.8 mm, L1=1.5 mm, and L2=2.0 mm, where W1=1.6 mm to 3.2 mm.

As shown in FIG. 11, it was confirmed that, where W1=1.8 mm to 2.4 mm (i.e., in the range of 0.024λ to 0.032λ where λ=75.0 mm, and in the range of 0.039λg to 0.052λg where λg=45.8 mm), the average value of the VSWR in the working frequency band was 1.05 or lower.

Figure 12:
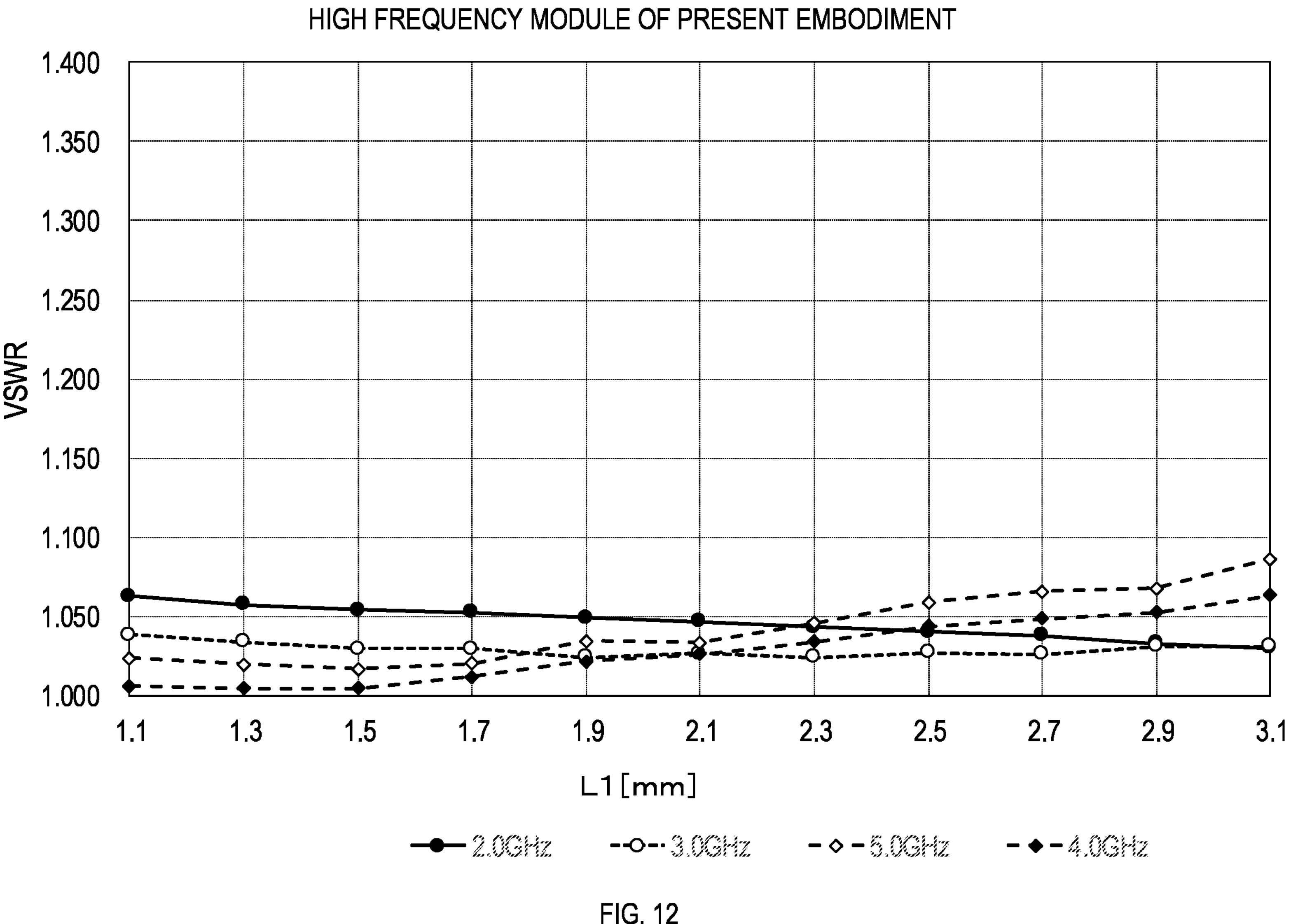
FIG. 12 is a graph showing a calculation result of the VSWR by a simulation where a length (i.e., a pattern length of a terminal pad) L1 of the connection portion protruding from a pattern surface of the antenna board is varied in the high frequency module of the present embodiment.

FIG. 12 is a graph showing a calculation result of the VSWR by a simulation using the high frequency module 1 of the present embodiment, in which the length L1 of protrusion of the leading end portion 33A of the connection portion 33 from the pattern surface 5B of the antenna board 5 is varied. Specifically, setting was made such that W1=2.0 mm, W21=0.8 mm, W22=2.0 mm, W3=4.4 mm, W4=1.5 mm, W5=0.8 mm, and L2=2.0 mm, where L1=1.1 mm to 3.1 mm.

As shown in FIG. 12, it was confirmed that, where L1=1.1 mm to 3.1 mm (i.e., in all measured ranges), the average value of the VSWR in the working frequency band was 1.05 or lower.

4. Correspondence of Terms

In the present embodiment, the circuit board 3 corresponds to an example of a first board of the present disclosure. The connection board 4 and the antenna board 5 correspond to examples of a second board of the present disclosure. In the present embodiment, the feed line 34 corresponds to an example of a first line pattern of the present disclosure, and the antenna feed line 53 corresponds to an example of a second line pattern of the present disclosure. In the present embodiment, the connection line 35 corresponds to an example of a connection pattern of the present disclosure, the connection line 35A corresponds to an example of a narrow line of the present disclosure, and the connection line 35B corresponds to an example of a wide line of the present disclosure.

5. Effects

The embodiment as detailed above exerts following effects.

The high frequency module 1 additionally comprises a portion having the line width W22 (i.e., the connection line 35B) different from a portion having the line width W21 (i.e., the connection line 35A) set for obtaining a specific impedance in the connection line 35. In the high frequency module 1, the line width W22 of the connection line 35B is added as an adjustment target in addition to the width W1 of the leading end portion 33A of the connection portion 33. Thus, a frequency range satisfying a desired VSWR, that is, a frequency range in which the high frequency module 1 can be used, can be expanded to higher frequency.

6. Other Embodiments

Although the present embodiment has been described above, the present disclosure is not limited to the above-described embodiment and can be implemented in various modified forms.

(6a) In the embodiment above, an example of connecting the circuit board 3 to the connection board 4 or to the antenna board 5 is described. However, the board connected to the circuit board 3 does not necessarily have to comprise an antenna device. A board mounted with any high frequency circuit may be connected.

(6b) A plurality of functions of a single element in the afore-mentioned embodiments may be achieved by a plurality of elements, or a function of a single element may be achieved by a plurality of elements. A plurality of functions of a plurality of elements may be achieved by a single element, or a function achieved by a plurality of elements may be achieved by a single element. A part of a configuration in the aforementioned embodiments may be omitted. At least a part of a configuration in the afore-mentioned embodiments may be added to, or may replace, another configuration in the aforementioned embodiments.

What is claimed is:

1. A high frequency module, comprising:

a first board comprising a connection portion protruding from an end portion thereof; a second board comprising a board through-hole penetrating the second board in a thickness direction thereof; and a frame made of metal and interposed between the first board and the second board to support the first board and the second board integrally, wherein the first board and the second board are integral to each other with the connection portion being inserted through the board through-hole, wherein the first board comprises:

first line patterns provided on both surfaces of the first board to be opposite to each other and to form a tri-plate line, a terminal pad formed on a leading end of the connection portion penetrating the board through-hole, and a connection pattern that connects the first line pattern and the terminal pad and has a line width increasing stepwise from the terminal pad toward the first line pattern, wherein the second board comprises:

a second line pattern formed on a pattern surface of the second board to form a microstrip line together with a ground pattern formed on a grounding surface opposite to the pattern surface, and a connection pad that surrounds at least a portion of the board through-hole on the pattern surface, that is connected to one end of the second line pattern, and that is electrically connected to the terminal pad penetrating the board through-hole, wherein the connection portion reaches the board through-hole formed in the second board via a frame through-hole formed in the frame, and wherein the connection pattern forms a coaxial line having an inner circumference wall of the frame through-hole as an external conductor and the connection pattern as an inner conductor.

2. The high frequency module according to claim 1, wherein a line width of the first line pattern forming the tri-plate line, a line width of the second line pattern forming the microstrip line, and a line width of a narrow line of the connection pattern forming the coaxial line on a terminal-pad side are set to achieve the same impedance.

3. The high frequency module according to claim 2, wherein a pattern width of the terminal pad and a line width of a wide line, which is a portion of the connection pattern other than the narrow line, are set such that an average value of a VSWR in a working frequency band, in which the high frequency module is used, is 1.05 or lower.

4. The high frequency module according to claim 3, wherein when a shortened wavelength in the first board at central frequency of the working frequency band is defined as λg, the pattern width of the terminal pad is set from 0.039 λg to 0.052 λg, and the line width of the wide line is set from 0.035 λg to 0.057 λg.

5. The high frequency module according to claim 3, wherein the working frequency band is from 0.5 GHz to 5.5 GHz.

6. The high frequency module according to claim 1, wherein the second board comprises one or more antenna devices connected to the second line pattern, and the first board comprises a feed circuit for supplying a power to the second board through the first line pattern.

* * * * *